(12) United States Patent
Cochran

(10) Patent No.: US 6,355,148 B1
(45) Date of Patent: Mar. 12, 2002

(54) DIAPHRAGM WORKHOLDING DEVICE FOR ECM

(75) Inventor: Dustin A. Cochran, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/699,194

(22) Filed: Oct. 26, 2000

Related U.S. Application Data

(60) Provisional application No. 60/161,689, filed on Oct. 26, 1999.

(51) Int. Cl.[7] ................................................. B23H 3/04
(52) U.S. Cl. ................. 204/286.1; 204/287; 204/288.3; 204/297.01; 204/297.07; 204/297.08; 204/297.09; 204/280; 204/224 M; 205/652; 205/653; 205/654
(58) Field of Search ........................... 204/224 M, 280, 204/286.1, 287, 288.3, 297.01, 297.07, 297.08, 297.09; 205/652–654, 686

(56) References Cited

U.S. PATENT DOCUMENTS

| | | |
|---|---|---|
| 5,758,421 A | 6/1998 | Asada |
| 5,878,495 A | 3/1999 | Martens et al. |
| 5,914,832 A | 6/1999 | Teshima |
| 6,251,257 B1 * | 6/2001 | Cochran .................. 204/286.1 |

* cited by examiner

Primary Examiner—Bruce F. Bell
(74) Attorney, Agent, or Firm—Moser, Patterson & Sheridan LLP

(57) ABSTRACT

A workholder for an ECM process comprises a set of jaws which define an interior workpiece holding region are mounted on the surface of a diaphragm which is movable under air pressure from a flat to a more generally spheroid shape with the injection of pressurized air between the diaphragm and a backing plate. As the air is injected, and the diaphragm becomes more spheroid, the jaws are moved a substantially equal distance away from the center axis of the workholding region. The workpiece, which typically incorporates or is mounted on a circular shaft, is placed in the center of the workholding region, and the air pressure is removed, causing the diaphragm to return to its original flat shape and the jaws to snap back to their original positions resting against the shaft. With the workpiece now held firmly and repeatably in place about a consistent axis, an electrode can be moved up to a point across a small gap from the surface where grooves are to be formed; with the flow of electrolyte through this gap, and the application of electricity across the gap, the grooves can be formed on the surface.

9 Claims, 5 Drawing Sheets

CROSS SECTION, FULLY DEFLECTED

CROSS SECTION, RELAXED

DIAPHRAGM WORKHOLDING DEVICE FOR ECM

CROSS-REFERENCE TO RELATED APPLICATION

This application is based on U.S. Provisional Patent Application Ser. No. 60/161,689 filed on Oct. 26, 1999, entitled DIAPHRAGM WORKHOLDING DEVICE FOR ECM, invented by inventor Dustin A. Cochran. The priority of this provisional application is hereby claimed and is incorporated herein by reference.

FIELD OF THE INVENTION

This invention pertains generally to the field of fluid dynamic bearings, and more particularly to etching grooves in a hub used in a spindle motor of a disc drive to form such bearings.

BACKGROUND OF THE INVENTION

Disc drives, including magnetic disc drives, optical disc drives and magneto-optical disc drives, are widely used for storing information. A typical disc drive has one or more discs or platters which are affixed to a spindle and rotated at high speed past a read/write head suspended above the discs on an actuator arm. The spindle is turned by a spindle drive motor. The motor generally includes a shaft having a thrust plate on one end, and a rotating hub having a sleeve and a recess into which the shaft with the thrust plate is inserted. Magnets on the hub interact with a stator to cause rotation of the hub relative to the shaft.

In the past, conventional spindle motors frequently used conventional ball bearings between the hub and the shaft and the thrust plate. However, over the years the demand for increased storage capacity and smaller disc drives has led to the read/write head being placed increasingly close to the disc. Currently, read/write heads are often suspended no more than a few millionths of an inch above the disc. This proximity requires that the disc rotate substantially in a single plane. Even a slight wobble or run-out in disc rotation can cause the disc to strike the read/write head, damaging the disc drive and resulting in loss of data. Because this rotational accuracy cannot be achieved using ball bearings, the latest generation of disc drives utilize a spindle motor having fluid dynamic bearings on the shaft and the thrust-plate to support a hub and the disc for rotation.

In a fluid dynamic bearing, a lubricating fluid such as gas or a liquid or air provides a bearing surface between a fixed member and a rotating member of the disc drive. Dynamic pressure-generating grooves formed on a surface of the fixed member or the rotating member generate a localized area of high pressure or a dynamic cushion that enables the spindle to rotate with a high degree of accuracy. Typical lubricants include oil and ferromagnetic fluids. Fluid dynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a fluid dynamic bearing. Also, the use of fluid in the interface area imparts damping effects to the bearing which helps to reduce non-repeat runout.

One generally known method for producing the dynamic pressure-generating grooves is described in U.S. Pat. No. 5,758,421, to Asada, (ASADA), hereby incorporated by reference. ASADA teaches a method of forming grooves by pressing and rolling a ball over the surface of a workpiece to form a groove therein. The diameter of the ball is typically about 1 mm, and it is made of a material such as carbide which is harder than that of the workpiece. This approach and the resulting fluid dynamic bearing, while a tremendous improvement over spindle motors using a ball bearing, is not completely satisfactory. One problem with the above method is the displacement of material in the workpiece, resulting in ridges or spikes along the edges of the grooves. Removing these ridges, for example by polishing or deburring, is often a time consuming and therefore a costly process. Moreover, to avoid lowering yields, great care must be taken not to damage the surface of the workpiece.

A further problem with the above method is due to a recent trend in disc drives toward higher rotational speeds to reduce access time, that is the time it takes to read or write data to a particular point on the disc. Disc drives now commonly rotate at speeds in excess of 7,000 revolutions per minute. These higher speeds require the shaft and the hub to be made of harder material. Whereas, in the past one or more of the shaft, the sleeve or the hub, could be made of a softer material, for example brass or aluminum, now all of these components must frequently be made out of a harder metal such as, for example, steel, stainless steel or an alloy thereof. These metals are as hard or harder than the material of the ball. Thus, the above method simply will not work to manufacture fluid dynamic bearings for the latest generation of disc drives.

Another method for producing the grooves of a fluid dynamic bearing is described in U.S. Pat. No. 5,878,495, to Martens et al. (MARTENS), hereby incorporated by reference. MARTENS teach a method of forming dynamic pressure-generating grooves using an apparatus, such as a lathe, having a metal-removing tool and a fixture that moves the workpiece incrementally in the direction in which a pattern of grooves is to be formed. The metal-removing tool forms the grooves by carrying out a short chiseling movement each time the workpiece is moved. This approach, while an improvement over the earlier one in that it does not produce ridges that must be removed, is also not completely satisfactory. For one thing, this approach like that taught by ASADA is typically not suitable for use with harder metals, which in addition to being more difficult to machine are often brittle and can be damaged by the chiseling action. Moreover, because each groove or portion of a groove must be individually formed and the workpiece then moved, the process tends to be very time consuming and therefore costly. Furthermore, the equipment necessary for this approach is itself expensive and the metal-removing tool is subject to wear and requires frequent replacement.

A final method for producing the grooves involves a conventional etching process as described in U.S. Pat. No. 5,914,832, to Teshima (TESHIMA), hereby incorporated by reference. TESHIMA teaches a process in which the workpiece is covered with a patterned etch resistant coating prior to etching so that only the exposed portions of the workpiece are etched. While this approach avoids many of the problems of the previously described methods, namely the formation of ridges around the grooves and the inability to form grooves in hard metal, it creates other problems and therefore is also not wholly satisfactory. One problem is the time consumed in applying and patterning the etch resistant coat. This is particularly a problem where, as in TESHIMA, the resist coat must be baked prior to patterning or etching. Another problem is that the coating must be removed after etching. This is frequently a difficult task, and one that if not done correctly can leave resist material on the workpiece surface resulting in the failure of the bearing and destruction of the disc drive. Yet another problem with this approach is that each of the steps of the process requires the extensive use of environmentally hazardous and often toxic chemicals including photo resists, developers, solvents and strong acids.

Accordingly, there is a need for an apparatus and method for forming grooves in a workpiece made of a hard metal to manufacture fluid dynamic bearings suitable for use in a disc drive. It is desirable that the apparatus and method that allows the grooves to formed quickly and cheaply. It is also desirable that the apparatus and method not require expensive equipment or the use of a metal-removing tool that must be frequently replaced. It is further desirable that the apparatus and method not use an etch resistant material during manufacture that could contaminate the workpiece leading to the failure of the bearing and destruction of the disc drive.

As the result of the above problems, electrochemical machining of grooves in a fluid dynamic bearing has been developed as described in the above-incorporated patent application. A broad description of ECM is as follows. ECM is a process of removing material metal without the use of mechanical or thermal energy. Basically, electrical energy is combined with a chemical to form a reaction of reverse electroplating. To carry out the method, direct current is passed between the work piece which serves as an anode and the electrode, which typically carries the pattern to be formed and serves as the cathode, the current being passed through a conductive electrolyte which is between the two surfaces. At the anode surface, electrons are removed by current flow, and the metallic bonds of the molecular structure at the surface are broken. These atoms go into solution, with the electrolyte as metal ions and form metallic hydroxides. These metallic hydroxide (MOH) molecules are carried away to be filtered out. However, this process raises the need to accurate and simultaneously placed grooves on a surface across a gap between the electrode and the workpiece which must be very accurately set. This requires the use of a work holder which can accurately locate and constrain a circular workpiece within an electrochemical machining process (ECM). ECM is used to place grooves on the moving parts of a fluid dynamic motor. The depth of these grooves has a typical tolerance of ±0.003 mm. Therefore the electrode/workpiece position error must be no greater than this. In addition to the accuracy, the workholder must be without moving parts. The salt dissolved in the electrolyte will crystallize and hinder their movement.

The present invention provides a solution to these and other problems, and offers other advantages over the prior art.

SUMMARY OF THE INVENTION

The present invention relates to a method and apparatus for holding a workpiece while electrochemically etching grooves in a surface of the workpiece to form a fluid dynamic bearing.

In accordance with one embodiment, a workholder comprises a set of jaws which define an interior workpiece holding region are mounted on the surface of a diaphragm which is movable under air pressure from a flat to a more generally spheroid shape with the injection of pressurized air between the diaphragm and a backing plate. As the air is injected, and the diaphragm becomes more spheroid, the jaws are moved a substantially equal distance away from the center axis of the workholding region. The workpiece, which typically incorporates or is mounted on a circular shaft, is placed in the center of the workholding region, and the air pressure is removed, causing the diaphragm to return to its original flat shape and the jaws to snap back to their original positions resting against the shaft. With the workpiece now held firmly and repeatably in place about a consistent axis, an electrode can be moved up to a point across a small gap from the surface where grooves are to be formed; with the flow of electrolyte through this gap, and the application of electricity across the gap, the grooves can be formed on the surface.

Other features and advantages of this invention will be apparent to a person of skill in this field who studies the following detailed description of an embodiment of the invention given in conjunction with the associated drawings.

DETAILED DESCRIPTION OF THE INVENTION

Figure 1:
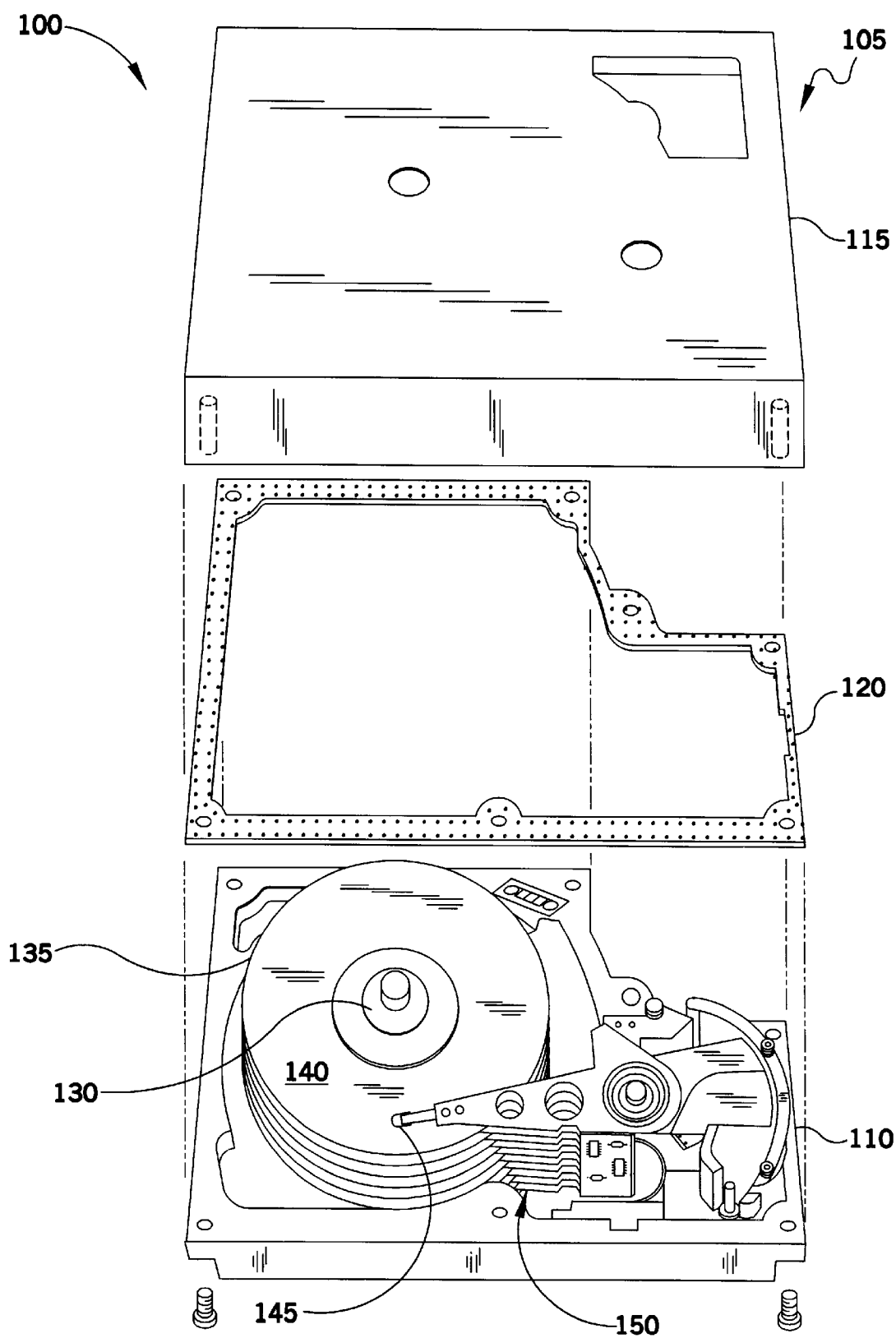
FIG. 1 illustrates a disc drive in which a motor incorporating the hydrodynamic bearing whose grooves are formed using the present invention is especially useful.

FIG. 1 is an exploded perspective view a magnetic disc drive for which a spindle motor having a fluid dynamic bearing manufactured by the method and apparatus of the present invention is particularly useful. Referring to FIG. 1, a disc drive 100 typically includes a housing 105 having a base 110 sealed to a cover 115 by a seal 120. The disc drive 100 has a spindle 130 to which are attached a number of discs 135 having surfaces 140 covered with a magnetic media (not shown) for magnetically storing information. A spindle motor (not shown in this figure) rotates the discs 135 past read/write heads 145 which are suspended above surfaces 140 of the discs by a suspension arm assembly 150. In operation, spindle motor rotates the discs 135 at high speed past the read/write heads 145 while the suspension arm assembly 150 moves and positions the read/write heads over one of a several radially spaced tracks (not shown). This allows the read/write heads 145 to read and write magnetically encoded information to the magnetic media on the surfaces 140 of the discs 135 at selected locations.

Figure 2A:
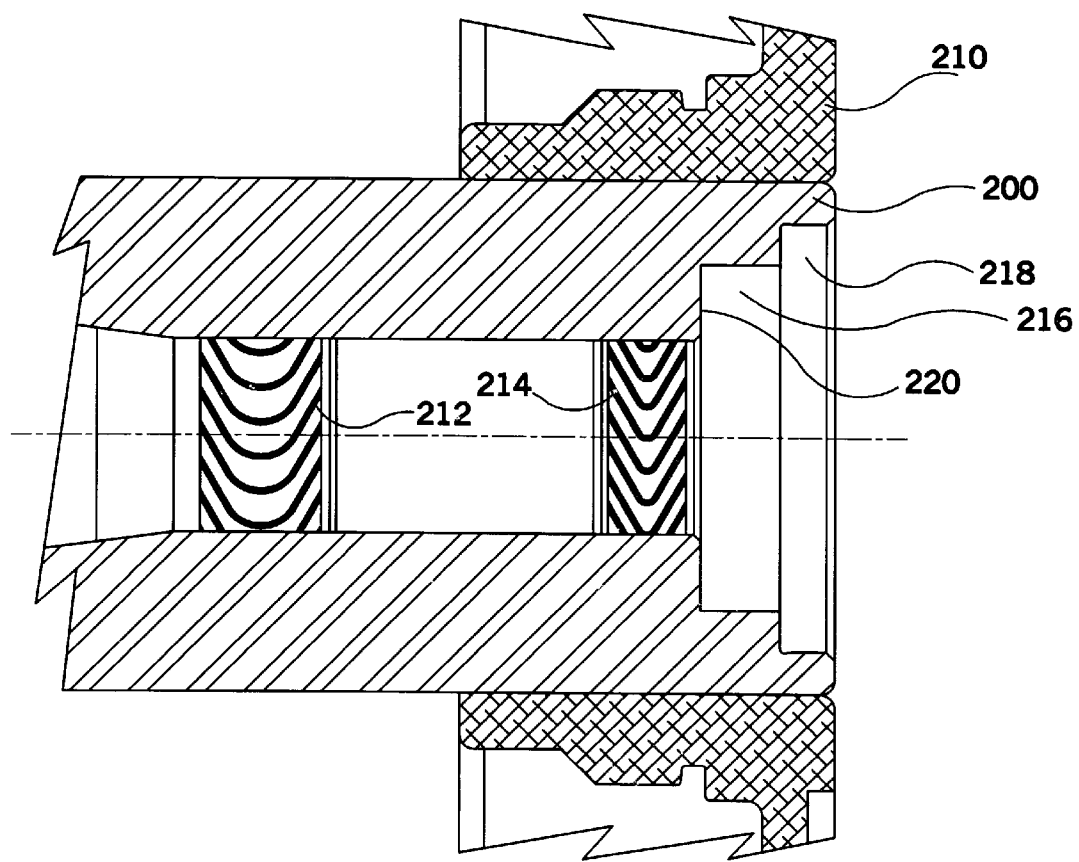
FIGS. 2A and 2B are vertical section and top plan view of a portion of the spindle motor of FIG. 1 illustrating the grooves which maybe formed utilizing the present invention.
Figure 2B:
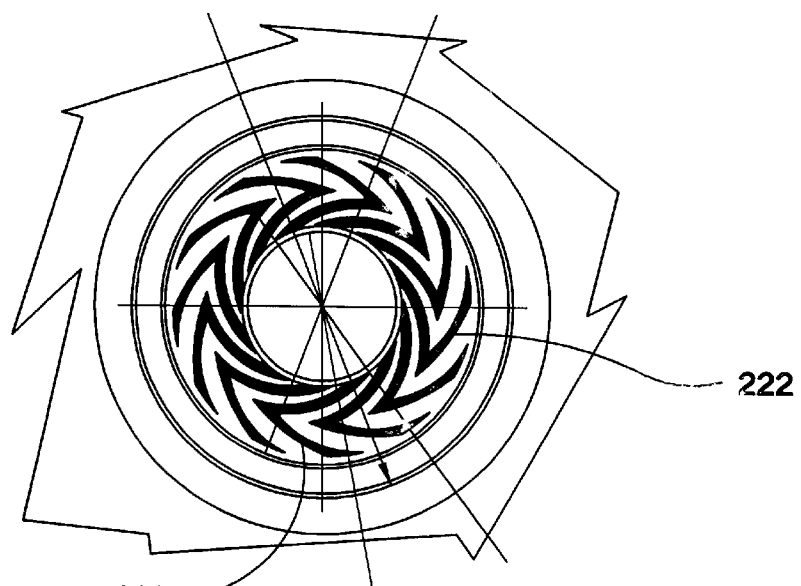

FIGS. 2A and 2B are a vertical sectional view and top plan view, respectively, of a hub and sleeve combination illustrating the grooves which may be formed utilizing the present invention to establish the hydrodynamic bearing necessary to support the sleeve and hub for rotation about a shaft. Therefore for example in accordance with design principles well known in this field, the sleeve 200 supports on its outer surface a hub 210 which in turn will support one or more discs for rotation. The internal surface of the main bore includes a pair of grooves 212, 214 which in cooperation with the shaft (not shown) will form the journal bearings which are used to support the hub for rotation about a shaft.

Typically, such a design also includes a thrust plate supported on one end of the shaft and not shown in this figure. A recess 216 is provided for the thrust plate; a second recess 218 is provided for the counterplate which overlies the thrust plate in the assembled motor and is used to define the hydrodynamic bearing gap with the upper surface of the thrust plate. The lower surface of the thrust plate faces a surface 220 of the sleeve which is shown in the top plan view of FIG. 2B. As shown herein, this surface also includes a set of grooves 222 which in this case are in the shape of a succession of chevrons and which cooperate with the undersurface of the thrust plate to create a pressure gradient which will support the thrust plate for smooth rotation and prevent tilting of the thrust plate and the shaft to which it is affixed so the hub rotates with great stability around the shaft.

It is clear that because of the very small tolerances between the shaft and the thrust plate it supports and the internal surfaces of the sleeve, that the sleeve must be held with great stability in a jig of some sort while the ECM process is carried out; any variation in the gap between the sleeve and the electrode would cause a variation in the depth, spacing and placement of the grooves. As noted above, the fixture must be capable of holding the circular workpiece so that the depth of grooves will have a typical tolerance of ±0.003 millimeters. Further, the fixture or workholder must be without moving parts because the salt dissolved in the electrolyte which is an essential element of the ECM process will crystallize and hinder the movements of such working parts.

Figure 3:
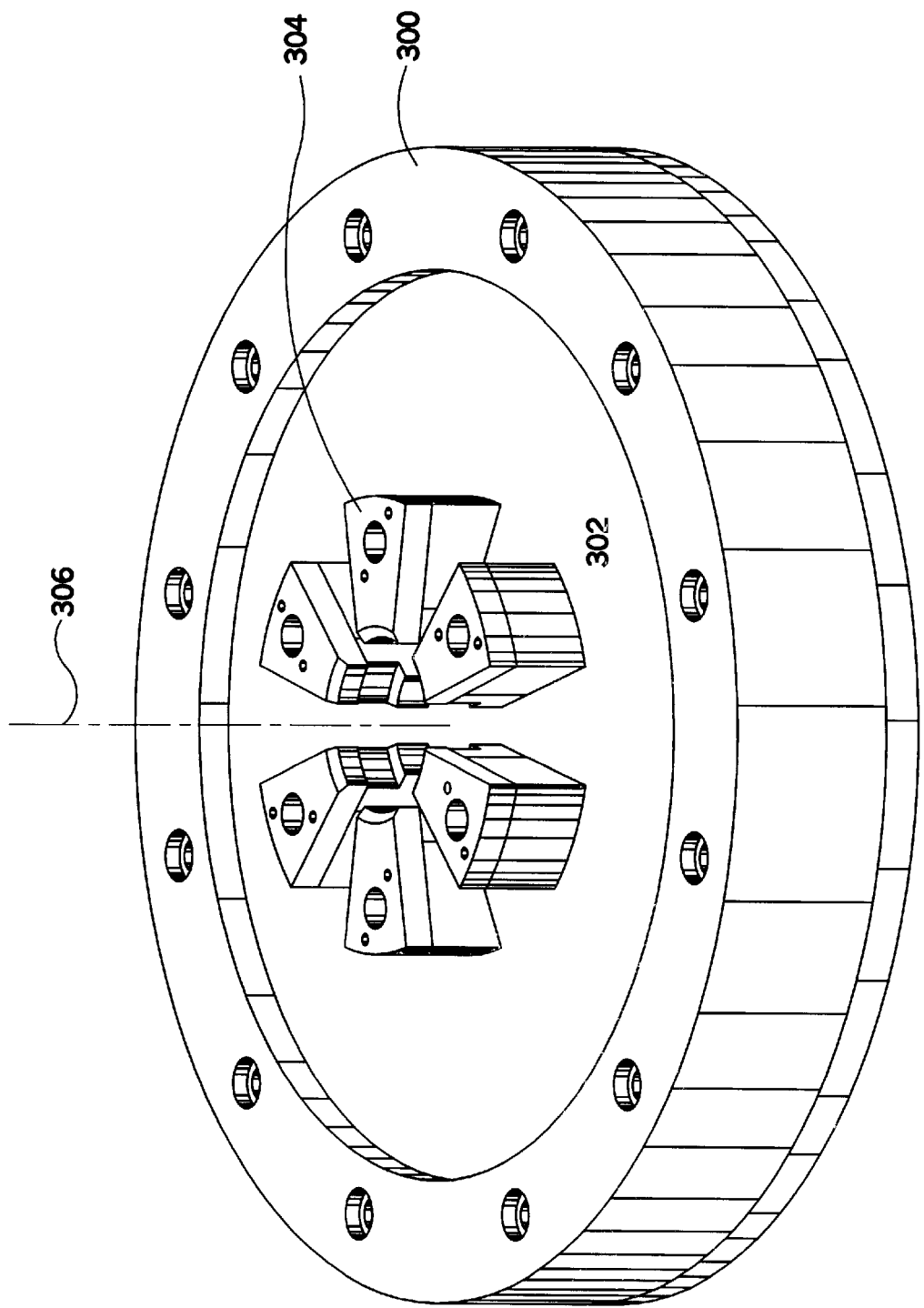
FIG. 3 is a perspective view of the diaphragm workholding device of the present invention.
Figure 4:
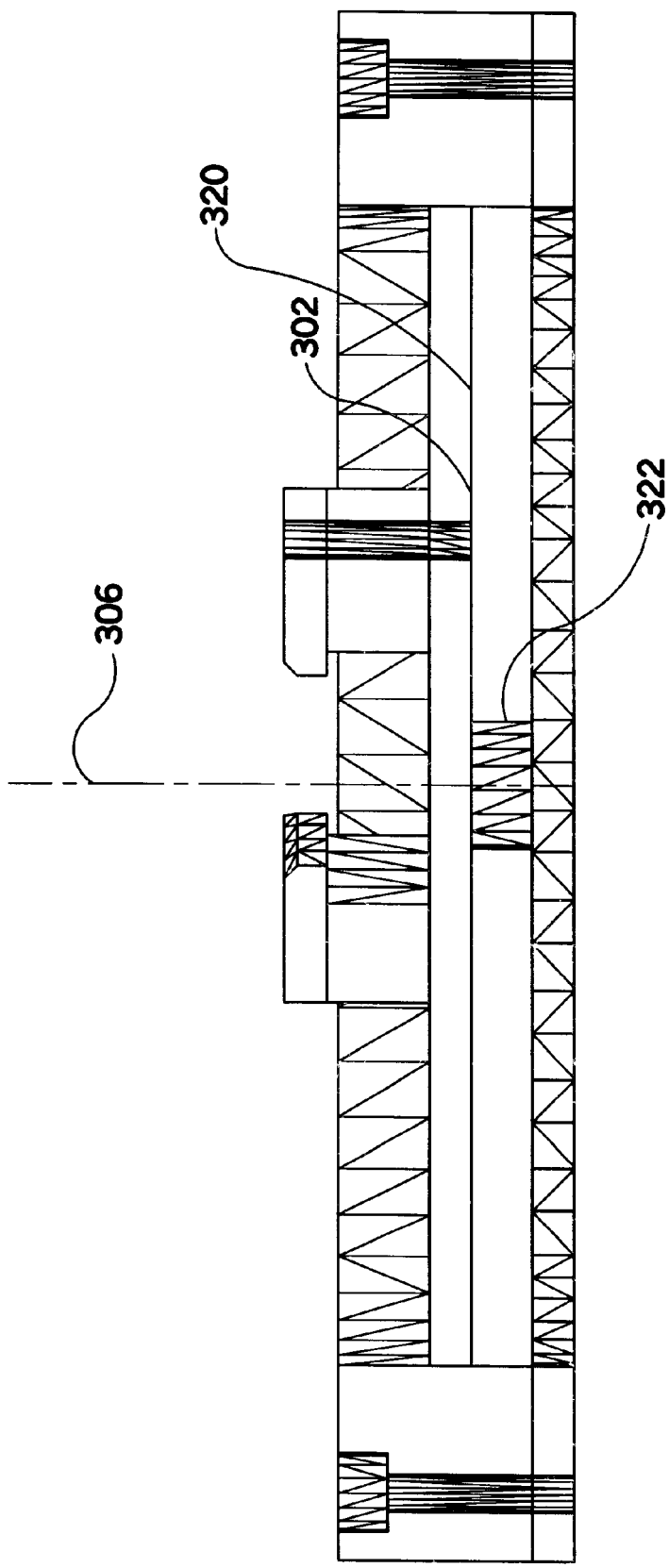
FIG. 4 is a cross section of the device of FIG. 3 shown with the diaphragm deflected.
Figure 5:
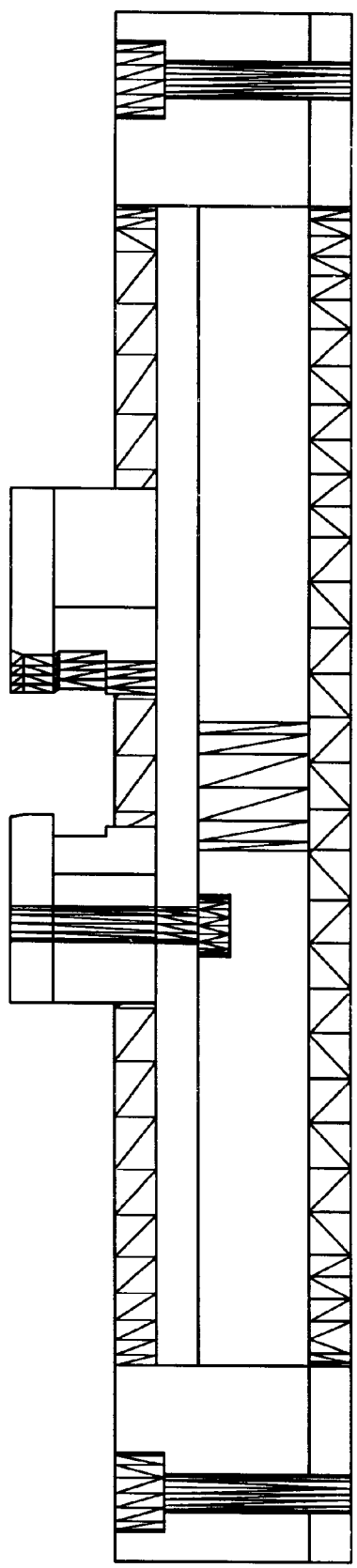
FIG. 5 is a view along the same section line as FIG. 4 showing the device in its relaxed state with the air pressure removed.

To achieve these goals, the work holder or fixture of FIGS. 3, 4 and 5 was designed, comprising a frame 300 which supports a diaphragm 302 having a plurality of jaw-like workholders 304 facing a common central axis 306. As shown more clearly in FIG. 4 which should be considered in conjunction with FIG. 3, as the diaphragm is deflected upward to assume a slightly more spheroidal shape, the jaws 304 are uniformly deflected away from the central axis 306 so that a circular or shaft based workpiece such as shown in FIGS. 2A and 2B can be inserted therein. As the air pressure is withdrawn, the deflected jaws 304 return to their original position as the diaphragm 302 flattens out, capturing the shaft or circular workpiece between the jaws. This operation is more readily apparent from the cross section of FIG. 4 which shows the diaphragm relative to the backing plate 320. As air is injected through the air inlet 322, it can be seen that the diaphragm will deflect upwardly along the axis 306 with the upper part of each jaw leaning a little further away from the axis 306 than the lower part. This opening between the jaws allows for the insertion of the shaft or circular workpiece. When the void between the diaphragm 302 and backing plates 320 is depressurized, the diaphragm will snap back to its original position, resting firmly against the backplate. The inner diameter of the generally circular work area defined by the jaws will be reduced, capturing the workpiece with a high level of precision accuracy. FIG. 5 shows these jaws returned to their original position.

So long as the air pressure does not exceed a predefined amount, the maximum bending moment of the diaphragm will not exceed the allowable, allowing substantial repeatability. Further, since the workpiece is consistently held in a repeatably reliable position, with its axial position being defined by the diaphragm, and its radial position accurately fixed by the jaws, an electrode can easily be inserted along the same axis 306. With the electrode in place, the electrolyte can be applied, and electrical current applied to the system, carrying out the ECM process to form the desired grooves on the workpiece.

Other features and advantages of this invention will be apparent to a person of skill in the art who will also understand that variations within the scope of the invention may also be adopted, including modifying the shape of the jaws, and the shape of the workspace defined by the jaws. Therefore, the scope of the present invention is to be limited only by the following claims.

What is claimed:

1. A workholding device for holding a shaft or shaft-based workpiece comprising a planar diaphragm overlying a planar backing plate, the diaphragm supporting a plurality of gripping members defining a workpiece holding region, and a source of air to be injected between the diaphragm and the backing plate, injection of air between the diaphragm and the backing plate causing uniform movement of the workholding pieces away from a central axis of the diaphragm, removal of the air allowing the return of the workholding pieces to their original position to capture the workpiece.

2. A device as claimed in claim 1 wherein the workholding pieces are arranged in a substantially circular array around the common central axis.

3. A device as claimed in claim 1 wherein each of the workholding pieces is a U-shaped piece to capture the workpiece in the center region of the U-shaped piece.

4. A device as claimed in claim 3 including an odd number of workholding pieces arrayed around the central axis.

5. A device as claimed in claim 1 wherein the diaphragm overlies the backing plate and is substantially circular in shape, the edges of the diaphragm being captured against the backing plate so that injection of air between the backing plate and the diaphragm causes the diaphragm to adopt a substantially spheroidal shape.

6. A device as claimed in claim 5 comprising a plurality of jaw-shaped workholders uniformly directed away from the central axis so that a circular shaft-based workpiece can be inserted therein while the air pressure is maintained.

7. A device as claimed in claim 5 including an electrode adapted to be inserted into the workpiece along the axis of the workholding device, the electrode supporting a plurality of one or more grooved patterns which are to be replicated on the surface of the workpiece.

8. A device as claimed in claim 1 wherein the air pressure does not exceed a predefined amount so that the maximum bending moment of the diaphragm is not exceeded.

9. Apparatus for fixedly holding a work piece comprising means for grasping an outer edge of the work piece, and means responsive to air injection for uniformly deflecting the grasping means away from a central axis to allow the work piece to be placed and, after termination of air injection, held.

* * * * *